United States Patent
Balkany

[15] 3,648,729
[45] Mar. 14, 1972

[54] CHECK VALVE

[72] Inventor: John W. Balkany, 7300 S.W. 75th Ave., Miami, Fla. 33143

[22] Filed: Apr. 24, 1970

[21] Appl. No.: 31,571

[52] U.S. Cl. .................... 137/533.13, 137/533.15, 137/798
[51] Int. Cl. ............................................................ F16k 0/4
[58] Field of Search ................... 137/328, 454.5, 454.6, 515, 137/515.7, 533.13, 533.15, 533, 533.11, 798

[56] References Cited

UNITED STATES PATENTS

| | | | |
|---|---|---|---|
| 1,936,975 | 11/1933 | Wasson | 137/533.13 |
| 975,243 | 11/1910 | Hitchcock | 137/533.11 |
| 1,989,199 | 1/1935 | Hummert | 137/533.13 |
| 3,435,842 | 4/1969 | Ogawa | 137/454.6 |
| 1,779,322 | 10/1930 | Leidecker | 137/533.13 |

*Primary Examiner*—Harold W. Weakley
*Attorney*—Clarence A. O'Brien and Harvey B. Jacobson

[57] ABSTRACT

A ready-to-use valve assembly comprising three component parts, namely, a gasket ring having a valve seat, a ball check valve associatively cooperative with the seat and ring, and a coil spring carried by the ring and guidingly encaging the valve. This assembly when installed in standard T-coupling converts the same into a check valve for acceptable use in a new piping system or, alternatively, an equivalent existing system. It permits flow or fluid in one direction and prevents back-flow. Accordingly, the coupling serves not only to unite adjacent pipe sections but also serves as a check valve.

3 Claims, 2 Drawing Figures

PATENTED MAR 14 1972

3,648,729

John W. Balkany
INVENTOR.

BY Clarence A. O'Brien
and Harvey B. Jacobson
Attorneys

CHECK VALVE

This invention relates to fluid confining and flow controlling pipe lines and systems and pertains, more particularly, to a well known type fitting or coupling, a simple T-coupling, for example, which is provided with novel valve means, whereby it is thus given an additional function.

More specifically, the valve-equipped coupling is such in construction and adaptability that it can be used in new piping systems or inserted for practical and helpful use in existing systems. Its utilization in the pipe line between coacting pipe sections permits the flow of fluids, gases or liquid, in one direction but checks and prevents flow of the same in a reverse or back-flow direction. It can be employed to supplant customarily or commonly used self-contained check valves or can be used complementary to and in conjunction with existing type check valves. Movement of fluid in the line or conduit seats or unseats the ball valve and permits or stops flow as conditions may require.

A significant aspect of the concept has to do with the conversion or transformation of an ordinary pipe line T-coupling into a simple, practical, economical and accessible ball check valve. As will be hereinafter more fully appreciated the spring loaded ball, acted on by an appropriate compression spring, seats itself into the truncated conical valve seat provided therefor in a manner to permit flow of fluids in one direction only. Then, too, fluid pressure acts on and seats the ball which in turn applies the then present pressure to force the gasket ring tightly against the seat provided at a terminal end of a coacting pipe section.

Briefly the conduit or pipe line is characterized by two angularly cooperating pipe sections whose adjacent ends, usually threaded, are interconnected by a fitting, more particularly, a T-coupling. One end of the coupling is threaded for connection to a threaded end of a pipe section. The opposite axially aligned threaded end is provided with an insertable and removable closing plug or cap. The median lateral branch is connected with a second pipe section. The hollow portion of the coupling is equipped with a prefabricated ready-to-install unit, more particularly, a gasket ring which is adapted to be seated on an end of a designated pipe section. This gasket ring has an inner peripheral surface provided with an annulus whose inner peripheral surface is provided with a truncated conical surface constituting a valve seat. A ball check valve proportional in size and associatively cooperable with the seat is provided. In addition, a normally distended compression coil spring of predetermined tension, length and cross-sectional dimension is adapted to encage the ball and has a coil at one end operatively cooperable with the gasket ring.

The insertable and removable prefabricated unit or valve assembly embodies a coil spring which functions to seal the flexible seat, hold it in position and to serve in addition as a cage or guide for the ball without undesirably impeding fluid flow.

In carrying out the principles of the invention it will be evident that T-couplings (Tees of all sizes) are in and of themselves unaltered and the hollow portion thereof when joined with coacting end portions of the pipe sections provides a housing for the insertable and removable ball valve assembly.

The valve seat is so situated, preformed and designed that increased pressure against the valve increases the seal so that the valve compensates for higher pressures by sealing tighter. This factor is inherent in the design since the pressure on the ball is transmitted to the seat and tends to press it against the terminal end of the pipe section, to expand it and to wedge it tightly into position.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
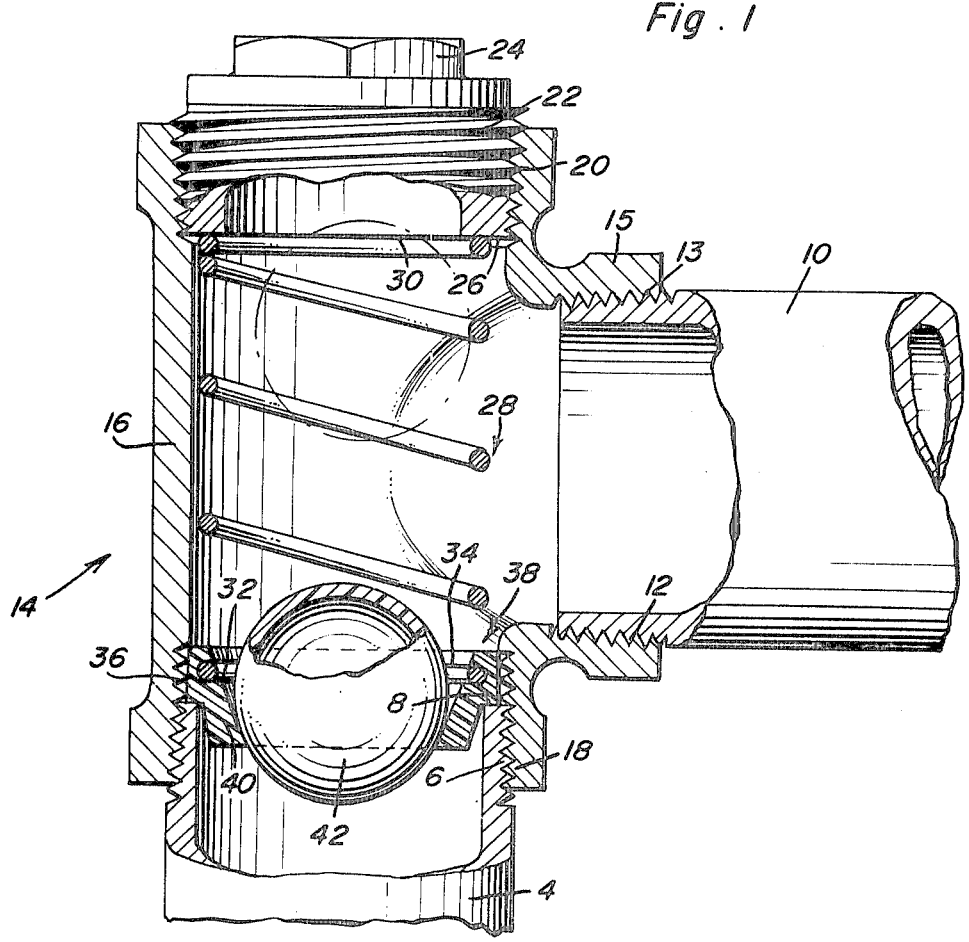
FIG. 1 is a view showing the aforementioned pipe line, that is coacting terminal end portions of two pipe sections, a T-coupling of ordinary form uniting the pipe sections and showing, in section and elevation, the ball valve assembly inserted into the coupling and transforming the same into a ball check valve.

With reference first to FIG. 1 it will be evident that one pipe section of the conduit or system is denoted by the numeral 4 and has a terminal externally screw-threaded end portion 6 the terminal end of which is denoted at 8 and constitutes a gasket shoulder as illustrated. The companion right angularly disposed pipe section is denoted at 10 and it likewise has an externally screw-threaded or terminal end portion 12. The threaded end portions of the two pipe sections are interconnected by a fitting, more specifically, a simple single branch T-coupling 14. The cylindrical hollow body portion is denoted at 16. One internally screw-threaded end portion 18 is threaded on the end 6 of pipe section 4. The other internally screw-threaded end portion 20 is provided with a so-called pipe plug, more specifically, a screw-threaded plug 22 which is threaded into the end portion 20 and has its solid end provided with an upstanding tool nut 24. The surface 26 of this plug provides a shoulder which is cooperable with the aforementioned shoulder 8.

Figure 2:
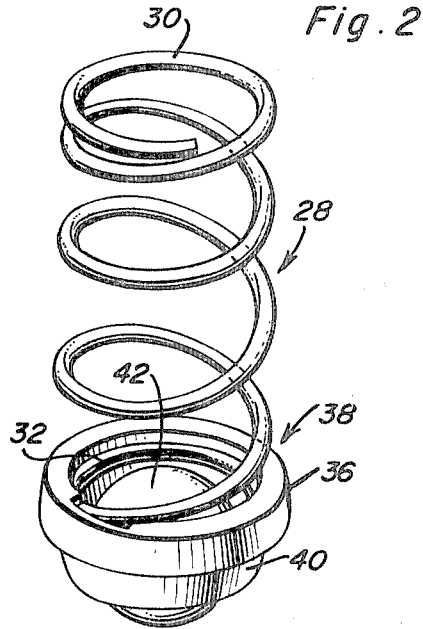
FIG. 2 is a view in perspective of the aforementioned ready-to-use ball valve assembly.

The insertable and removable and converting valve assembly is shown in FIGS. 1 and 2 and with reference in particular to FIG. 2 (showing the prefabricated unit) the compression coil spring is of requisite length, tension and cross section and is denoted by the numeral 28. The uppermost convolution or coil 30 has end thrust cooperation with the shoulder 26. The lowermost coil or convolution 32 is seated and keyed in an endless annular keying groove 34 which is provided therefor in a compressibly resilient gasket ring 36, constituting an integral part of the two-part spring anchor and ball seat 38. This ring is of requisite compressible resiliency and diameter in cross section to assume the seated and sealing position illustrated in FIG. 1. The inner peripheral surface is provided with a depending annulus 40 which is here designated as a truncated ball seat, that is a seat for the cooperable ball check valve 42.

The aforementioned pipe section 10 has its threaded end 12 joined to the threads 13 on the coacting branch 15.

It will be evident that the ball 42 seats in the gasket in a manner to permit flow of fluids in but one direction. Fluid pressure, such as is present in any closed fluid system, seats the ball which in turn applies the requisite pressure to force the gasket 36 tighter against the shoulder 8, whereby to prevent leakage. Movement of fluid seats or unseats the ball check valve, stopping or permitting the flow as desired.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A fluid handling and circulating pipeline comprising, in combination, a pair of companion fluid conducting pipe sections having external screw-threaded ends disposed at right angles relative to each other, a conventional type T-coupling having axially aligned open internally screw-threaded opposite ends and a lateral screw-threaded branch on one side, the screw-threaded end of one pipe section being screwed into one open screw-threaded end of the body of said T-coupling, the screw-threaded end of the other pipe section being screwed into the lateral screw-threaded branch on said one side of said coupling, a prefabricated ready-to-install valving unit fitted into the body portion of said coupling and embodying a gasket ring which is seated on an end of said one pipe section, said gasket ring having an inner peripheral surface provided with an annulus whose inner periphery is provided with a truncated conical surface constituting a valve seat, a ball check valve proportional in size and associatively cooperable with said seat and partially nested within the confines of the truncated conical valve seat, a normally distended coil spring fitted within the confines of the body portion of said coupling and having a lower end coil retentively keyed into a groove provided therefor in the inner peripheral surface of said gasket ring, said coil spring enclosing and encaging said ball valve, and a pipe plug having a screw-threaded portion screwed into the screw threads provided therefor in an upper end of said coupling and having an accessible integral plug applying and removing nut, an upper convolution of said coil spring having end thrust engagement with a coacting surface of said pipe plug.

2. A fluid handling and circulating pipeline defined in and according to claim 1, and wherein said gasket ring is made of compressibly resilient material, said check valve being likewise made of compressibly resilient material and being proportional in size with the aforementioned truncated conical surface.

3. For use in converting a conventional T-shaped pipe coupling into a backflow preventing check valve, a prefabricated insertable and removable valving unit comprising a compressibly resilient gasket ring having an annulus whose inner periphery is fashioned into and provides a truncated conical surface, said surface constituting a valve seat, that portion of the gasket ring above the plane of said seat being provided with a coil accommodating an anchoring groove, a compressibly resilient ball check valve proportional in size and associatively cooperable with and nested on said seat, and a normally distended coil spring of predetermined tension, length and cross-sectional dimension surrounding and encaging said ball check valve and having an assembling and retaining coil at a lower end, said coil being retentively keyed in said groove, the upper end of said coil spring having a free terminal coil which when in use is adapted to abut a relatively stationary end thrust surface.

* * * * *